United States Patent
Liu (10) Patent No.: US 12,209,910 B2
(45) Date of Patent: Jan. 28, 2025

(54) RADIO FREQUENCY TAGGING OPTICAL SPECTROMETER AND METHOD FOR MEASUREMENTS OF OPTICAL SPECTRA

(71) Applicant: NANYANG TECHNOLOGICAL UNIVERSITY, Singapore (SG)

(72) Inventor: Quan Liu, Fujian (CN)

(73) Assignee: Xiamen University, Xiamen (CN)

(*) Notice: Subject to any disclaimer, the term of this patent is extended or adjusted under 35 U.S.C. 154(b) by 208 days.

(21) Appl. No.: 18/092,394

(22) Filed: Jan. 2, 2023

(65) Prior Publication Data

US 2023/0152156 A1 May 18, 2023

(30) Foreign Application Priority Data

Jan. 3, 2022 (SG) .............................. 10202200019T (51) Int. Cl.
  G01J 3/45   (2006.01)
  G01J 3/02   (2006.01)
  G01J 3/18   (2006.01)

(52) U.S. Cl.
  CPC ............... G01J 3/45 (2013.01); G01J 3/0208 (2013.01); G01J 3/021 (2013.01); G01J 3/18 (2013.01); G01J 2003/451 (2013.01)

(58) Field of Classification Search
  CPC ........... G01J 2003/451; G01J 3/18; G01J 3/45
  See application file for complete search history.

(56) References Cited

U.S. PATENT DOCUMENTS 4,992,858 A * 2/1991 Kobayashi ............... H04N 3/02
                                                              348/754
2010/0185067 A1* 7/2010 Gupta ................... G01J 3/1256
                                                              600/323

FOREIGN PATENT DOCUMENTS

| CN | 110631805 A | * | 12/2019 | |
| CN | 111123560 A | * | 5/2020 | ............... G02F 1/11 |
| CN | 113237548 A | * | 8/2021 | ............ G01J 3/0205 |
| WO | WO-2013074000 A2 | * | 5/2013 | ......... H04Q 11/0005 |

OTHER PUBLICATIONS

Jean-Michel Guerin, Sound diffraction and the optimizing of acousto-optic modulator efficiency, 1979 (Year: 1979).*

* cited by examiner

Primary Examiner — Maurice C Smith (57) ABSTRACT

The present disclosure provides a radio frequency tagging optical spectrometer, comprising: a dynamic dispersion device, the dynamic dispersion device receiving a beam comprising more than two wavelength components and being driven by driving radio frequency signals, and the dynamic dispersion device encoding the intensity of each wavelength component into the amplitude of a different beat radio frequency signal based on different driving radio frequency signals, wherein the beat frequency of the different beat radio frequency signal is equal to the frequency of the corresponding driving radio frequency signal; a single-channel photodetector for detecting the sum of beat radio frequency signals formed by adding all the beat radio frequency signals; and a processing unit for performing Fourier transform on the sum of the beat radio frequency signals to obtain a spectrum or an associated radio frequency spectrum by which the optical spectrum is obtained.

20 Claims, 3 Drawing Sheets

RADIO FREQUENCY TAGGING OPTICAL SPECTROMETER AND METHOD FOR MEASUREMENTS OF OPTICAL SPECTRA

CROSS-REFERENCE TO RELATED APPLICATIONS

This application claims priority to Singapore Patent Application No. SG10202200019T filed on Jan. 3, 2022, the entire contents of which are incorporated herein by reference.

TECHNICAL FIELD

The present disclosure relates to a spectrometer, in particular to a radio frequency tagging optical spectrometer and method for the measurements of optical spectra.

BACKGROUND

Spectroscopy is widely used in many fields such as atmospheric science, food industry and medical diagnosis. The key equipment of spectroscopy is a spectrometer, through which spectral data can be obtained for subsequent analysis. Generally, spectrometers capable of high-speed spectral measurement are preferred, especially for studying dynamic phenomena. According to the working principle, currently available spectrometers may be roughly divided into the following types.

The first type uses a dispersion element such as a prism, a grating, or an acousto-optic filter based on angular dispersion of incident light. All wavelength components are measured simultaneously using a multi-channel detector such as a camera, or each wavelength component is measured sequentially using a single-channel detector such as a photodiode. The single-channel detector or each channel of the multi-channel detector receives only one wavelength of light at a time.

The second type implements spectral reconstruction based on wavelength multiplexing measurement and by, for example, Hadamard transformation and compressed sensing mathematical transformation. Instead of measuring an intensity of light at one wavelength at a time, this type of spectrometer measures one coefficient at a time, where each coefficient is a weighted sum of intensities of light at all wavelengths.

The third type involves measurement based on optical coherence. Incident light interferes with itself, but after being delayed for different time or optical path lengths, an interferogram is produced and a required spectrum is obtained by its Fourier transformation. Delays of a plurality of optical path lengths can be implemented sequentially or simultaneously, and interferograms can be recorded by a photodiode or a camera respectively.

Usually, in these technologies, the measurement process is sequentially switched from one wavelength component or one coefficient to another, which is slow. Moreover, in the technology of measuring all wavelength components or coefficients simultaneously, direct current (DC) detection is usually used, which is affected by signal drift and noise, thus limiting the measurement speed.

The fourth type is based on time dispersion of light, that is, optical pulses of each wavelength propagate for different time through the same distance in a dispersive medium such as an optical fiber. This principle is used to transform light from a spectral domain to a time domain, that is, time-stretched dispersion Fourier transformation, and to record spectra of a pulse source by using a fast single-channel detector.

Recently, the time dispersion of near-field light has been used to retrieve fluorescence spectra from quantum dots. The time dispersion technology is highly sensitive and can be fast with a built-in stimulated Raman scattering optical amplifier. Unfortunately, the method is only suitable for pulsed light, which limits the application of the method, for example, the method cannot be used in many common applications where light of continuous waves prevails. For continuous-wave spectroscopy, commercial spectrometers based on spectrometers and CCD/CMOS sensors, which can reach speeds of hundreds of kilohertz, are mainly used in optical coherence tomography (OCT) applications. The theoretical speed is limited by a frame rate of CCD/CMOS sensors, while the actual measurement speed is usually limited by a signal-to-noise ratio.

SUMMARY

In order to solve one of the above technical problems, the present disclosure provides a radio frequency tagging optical spectrometer and a method for the measurements of optical spectra.

According to one aspect of the present disclosure, a radio frequency tagging optical spectrometer is provided, including: a dynamic dispersion device, the dynamic dispersion device receiving a beam including more than two wavelength components and being driven by driving radio frequency signals, and the dynamic dispersion device encoding an intensity of each wavelength component into an amplitude of a different beat radio frequency signal based on different driving radio frequency signals, wherein the beat frequency of the different beat radio frequency signal is equal to the frequency of the corresponding driving radio frequency signal; a single-channel photodetector for simultaneously detecting a sum of beat radio frequency signals formed by adding all the beat radio frequency signals; and a processing unit for performing a Fourier transformation on the sum of the beat radio frequency signals to obtain the optical spectrum or obtain an associated radio frequency spectrum by which the optical spectrum is obtained.

According to another aspect of the present disclosure, a method for the measurements of optical spectra is provided, including: receiving a beam including more than two wavelength components by an acousto-optic deflector; driving the acousto-optic deflector by driving radio frequency signals, so that the acousto-optic deflector encodes an intensity of each wavelength component into an amplitude of a different beat radio frequency signal based on different driving radio frequency signals; detecting, by a single-channel photodetector, a sum of beat radio frequency signals formed by adding all the beat radio frequency signals; and performing a Fourier transformation on the sum of the beat radio frequency signals to obtain a spectrum or obtain an associated radio frequency spectrum by which the optical spectrum is obtained.

BRIEF DESCRIPTION OF THE DRAWINGS

Accompanying drawings, which illustrate exemplary embodiments of the disclosure and, together with the description, serve to explain the principles of the present disclosure, are included to provide a further understanding of the present disclosure, and are included in and form a part of this specification.

DETAILED DESCRIPTION OF THE DISCLOSURE

The present disclosure is described in further detail below in conjunction with the accompanying drawings and embodiments. It is to be understood that the specific embodiments described herein are merely used for explaining relevant contents, rather than limiting the present disclosure. In addition, it should be noted that, for the ease of description, only the parts related to the present disclosure are shown in the accompanying drawings.

It should be noted that the embodiments in the present disclosure and the features in the embodiments may be combined with each other on a non-conflict basis. The technical solutions of the present disclosure will be described in detail below with reference to the accompanying drawings and in conjunction with embodiments.

Unless otherwise noted, the exemplary embodiments/examples shown will be understood as illustrative features providing various details of some ways in which the technical concepts of the present disclosure may be implemented in practice. Accordingly, unless otherwise noted, features of various embodiments/examples may be additionally combined, separated, interchanged and/or rearranged without departing from the technical concepts of the present disclosure.

Terms used herein are for the purpose of describing specific embodiments and are not intended to be restrictive. As used herein, the singular forms "a" and "the" are also intended to include the plural unless the context clearly dictates otherwise. Further, when the terms "include" and/or "comprise" and variants thereof are used in this specification, the existence of the stated features, entirety, steps, operations, components, components and/or groups thereof is described, but the existence or addition of one or more other features, entirety, steps, operations, components, components and/or groups thereof is not excluded. It should also be noted that, as used herein, the terms "substantially", "approximately" and other similar terms are used as approximate terms and not as degree terms, so that they are used to explain inherent deviations in measured values, calculated values, and/or provided values that will be recognized by those of ordinary skill in the art.

Figure 1:
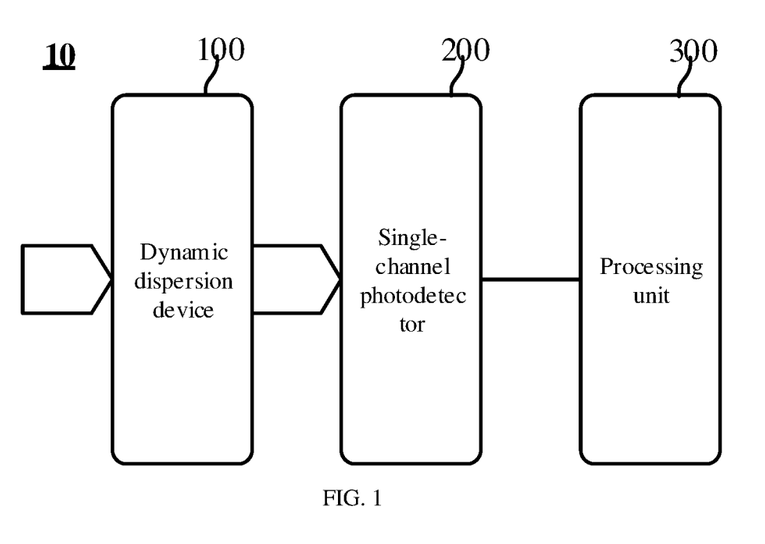
FIG. 1 is a schematic diagram of a radio frequency tagging optical spectrometer according to an embodiment of the present disclosure.

According to an embodiment of the present disclosure, a radio frequency tagging optical spectrometer is provided. FIG. 1 shows a schematic diagram of a radio frequency tagging optical spectrometer according to an embodiment of the present disclosure.

As shown in FIG. 1, the radio frequency tagging optical spectrometer 10 may include a dynamic dispersion device 100, a single-channel photodetector 200, and a processing unit 300. The radio frequency tagging optical spectrometer 10 is used for measuring spectra of continuous-wave light of a broadband light source or multi-line waves of a multi-line light source. By means of radio frequency measurement, the radio frequency tagging optical spectrometer 10 can reach a speed of several megahertz and improve a signal-to-noise ratio.

The dynamic dispersion device 100 may diffract a received beam according to an instruction of a driving signal to form a diffracted beam. The dynamic dispersion device 100 may receive a beam of more than two wavelength components and be driven by driving radio frequency signals. Herein, the term "wavelength component" refers to a component of a beam that is of a particular wavelength or range of wavelengths. The dynamic dispersion device 100 may encode an intensity of each wavelength component into an amplitude of a different beat radio frequency signal based on different driving radio frequency signals. The beat frequency of the different beat radio frequency signal is equal to the frequency of the corresponding driving radio frequency signal.

In the present disclosure, the dynamic dispersion device may be a dynamic diffraction gating, and may also be other devices capable of performing the same or similar function as the dynamic diffraction gating, and the meaning of the dynamic dispersion device should include the dynamic diffraction gating and such other devices. As an example, the dynamic dispersion device 100 may be an acousto-optic deflector. The acousto-optic deflector may be driven by driving radio frequency signals provided by a radio frequency amplifier. A programmable arbitrary function generator may be used for providing the driving radio frequency signals to the radio frequency amplifier. The driving radio frequency signals provided may correspond to each wavelength component respectively, that is, each wavelength component corresponds to a unique driving radio frequency signal. For example, when a beam includes three wavelength components, the acousto-optic deflector 10 may be driven by three different driving radio frequency signals. The three driving radio frequency signals correspond to the three wavelength components respectively. The first driving radio frequency signal encodes a light intensity of the first wavelength component into an amplitude of a first beat radio frequency signal, the second driving radio frequency signal encodes a light intensity of the second wavelength component into an amplitude of a second beat radio frequency signal, and the third driving radio frequency signal encodes a light intensity of the third wavelength component into an amplitude of a third beat radio frequency signal. The beat frequency of the first beat radio frequency signal is equal to the frequency of the first driving radio frequency signal, the beat frequency of the second beat radio frequency signal is equal to the frequency of the second driving radio frequency signal, and the beat frequency of the third beat radio frequency signal is equal to the frequency of the third driving radio frequency signal. In the present disclosure, wavelength components may be selected by programming driving radio frequency signals, so that a portion of a spectrum including most useful information may be detected.

The radio frequency amplifier may apply driving radio frequency signals of all wavelength components to the acousto-optic deflector simultaneously. The single-channel photodetector 200 detects a sum of the beat radio frequency signals formed by adding all the beat radio frequency signals. As an example, the single-channel photodetector 200 may be a single-channel avalanche photodetector. The processing unit 300 may be used for performing Fourier transform on the sum of the beat radio frequency signals to obtain a spectrum. Furthermore, the sum of the beat radio frequency signals may be processed by Fourier transform to obtain an associated radio frequency spectrum. the associated radio frequency spectrum is processed mathematically to eliminate the factor of dispersion efficiency to obtain the optical spectrum.

According to one embodiment of the present disclosure, the radio frequency tagging optical spectrometer may include a beam selection device. The beam selection device may select beams from the output beams of the dynamic dispersion device, such that each wavelength in those selected beams is encoded by a unique radio frequency. As an example, the beam selection device may be a spatial filter. The spatial filter may be composed of lenses and a pinhole. As an alternative, the spatial filter may be composed of lenses and a structure/device of the same function as that of the pinhole.

When a beam of one wavelength component passes through the acousto-optic deflector 110 driven by a corresponding driving radio frequency signal, the beam is split into a first-order diffracted beam and a zero-order transmitted beam (weaker higher-order diffraction is omitted for simplification) due to Bragg diffraction caused by acoustic wavefront, where the first-order diffracted beam inherits the frequency shift of the driving radio frequency signal provided to the acousto-optic deflector. When the first-order diffracted beam and the zero-order transmitted beam interfere with each other, an AC signal (beat radio frequency signal) is generated. The beat frequency of the AC signal is equal to the frequency of the driving radio frequency signal and the amplitude $I_I$ of the AC signal is proportional to a light intensity, as shown in Formula 1.

$$I_I = I + 2I\sqrt{\eta(1-\eta)}\cos(\omega t + \varphi)$$  Formula 1

Herein, I is a light intensity, $\eta$ is a diffraction efficiency of the acousto-optic deflector, $\omega$ is a frequency of the driving radio frequency signal, and $\varphi$ is a phase difference caused by an optical path length difference between the first-order diffracted beam and the zero-order transmitted beam.

For a broadband beam or multi-line beam including more than two wavelength components, a unique driving radio frequency signal is calculated for each wavelength component in the beam, so that when all the driving radio frequency signals are applied simultaneously, all the wavelength components are diffracted in the same direction to form a combined first-order diffracted beam and transmitted to form a combined zero-order transmitted beam. Then, the combined first-order diffracted beam interferes with the combined zero-order transmitted beam. Each wavelength component generates an AC signal (beat radio frequency signal) having a unique beat frequency. Thus, the beat frequency of each AC signal is equal to the frequency of the corresponding driving radio frequency signal, and the intensity of each wavelength component is proportional to the amplitude of the AC signal, as shown in Formula 2.

$$I'_1 = \sum_m \left[ I(\lambda_m) + 2I(\lambda_m)\sqrt{\eta(1-\eta)} \cos(\omega_m t + \varphi_m) \right]$$  Formula 2

Herein, $I'_I$ is a sum of amplitudes of all AC signals, I is a light intensity, $\eta$ is a diffraction efficiency of the acousto-optic deflector, m is the number of wavelength components, $\omega_m$ is a frequency of the m-th driving radio frequency signal, $\varphi_m$ is a phase difference caused by an optical path length difference between the m-th first-order diffracted beam and the zero-order transmitted beam, and $\lambda_m$ is a wavelength of the m-th wavelength component.

For an AC signal as a time domain signal, its spectrum can be recovered by Fourier transformation. Because the AC signal of each wavelength component has its own beat frequency, after the single-channel photodetector receives all AC signals simultaneously, a plurality of wavelength components can be resolved by their respective beat frequencies, thus realizing high-speed spectral measurement. The radio frequency tagging optical spectrometer of the present disclosure performs AC detection in a radio frequency range to resist 1/f noise and signal drift more effectively. In addition, the radio frequency tagging optical spectrometer may be used as a programmable filter to measure only wavelength components of interest, thus improving the measurement speed. For example, driving radio frequency signals of the acousto-optic deflector are controlled, so that in a case where the acousto-optic deflector receives a plurality of wavelength components, only some of the wavelength components are diffracted, and wavelength components of interest are selected accordingly. In addition, according to the embodiment of the present disclosure, the driving radio frequency signals of the acousto-optic deflector may be calculated and controlled according to the wavelength components of the beam.

Figure 2:
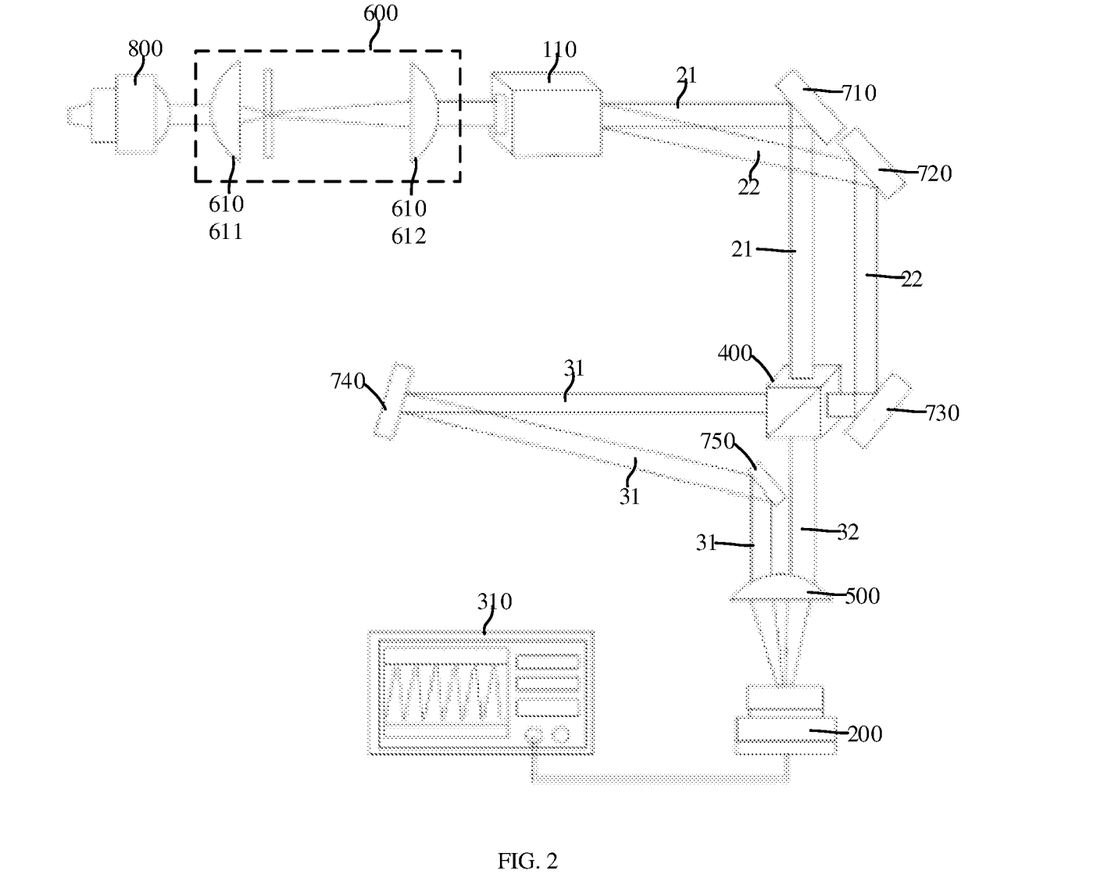
FIG. 2 is a schematic diagram of a radio frequency tagging optical spectrometer according to an example of the present disclosure.

FIG. 2 shows a schematic diagram of a radio frequency tagging optical spectrometer according to an example of the present disclosure. As shown in FIG. 2, the radio frequency tagging optical spectrometer may include an acousto-optic deflector 110, a first mirror assembly, a beam splitter 400, a second lens assembly, a focusing lens 500, and a single-channel photodetector 200.

The acousto-optic deflector 110 may be used for receiving a beam including more than two wavelength components. As shown in FIG. 2, the radio frequency tagging optical spectrometer may include a spatial filter 600. The spatial filter 600 is used for filtering an input beam from a light source. The spatial filter 600 may include a pair of achromatic lenses 610 and a pinhole 620. The pinhole 620 may be arranged between a first lens 611 and a second lens 612 of the pair of achromatic lenses 610. The spatial filter 600 may also be used for expanding the input beam, so as to completely fill an aperture of the acousto-optic deflector 110. The output beams of the spatial filter 600 are beams that include more than two wavelength components.

The acousto-optic deflector 110 may be driven by a radio frequency amplifier, and the radio frequency amplifier may be provided with driving radio frequency signals by a programmable arbitrary function generator and provide the driving radio frequency signals to the acousto-optic deflector 110. The driving radio frequency signals provided to the acousto-optic deflector 110 may be different driving radio frequency signals, each of which corresponds to a different wavelength component, so that the acousto-optic deflector 110 encodes an intensity of each wavelength component into an amplitude of a different beat radio frequency signal based on the different driving radio frequency signals.

The output of the acousto-optic deflector 110 may include a zero-order transmitted beam 21 (without frequency shift) and a first-order diffracted beam 22 (the frequency shift of which is equal to the frequency of the driving radio frequency signal). The first mirror assembly is used for reflecting the zero-order transmitted beam 21 and the first-order diffracted beam 22 to the beam splitter 400. The first mirror assembly may include a first mirror 710, a second mirror 720, and a third mirror 730. The first mirror 710 is used for reflecting the zero-order transmitted beam 21 to the beam splitter 400. The second mirror 720 and the third mirror 730 are used for reflecting the first-order diffracted beam 22 to the beam splitter 400. The first mirror 710, the second mirror 720, and the third mirror 730 are configured to minimize the optical path difference between the zero-order transmitted beam 21 and the first-order diffracted beam 22, so that the beam splitter 400 can generate maximum interference.

As described above, different driving radio frequency signals are simultaneously provided to the acousto-optic deflector 110, such that the zero-order transmitted beam 21 output by the acousto-optic deflector 110 is a combined zero-order beam of zero-order transmitted beams of different wavelength components, and the output first-order diffracted beam 22 is a combined first-order beam of first-order diffracted beams of different wavelength components. The beam splitter 400 is used for recombining the combined zero-order beam and the combined first-order beam to form a first interference beam 31 and a second interference beam 32. The second interference beam 32 propagates directly from the beam splitter 400 to the focusing lens 500. The first interference beam 31 is reflected to the focusing lens 500 via a fourth mirror 740 and a fifth mirror 750 of the second mirror assembly. The first interference beam 31 and the second interference beam 32 are focused to the single-channel photodetector 200 via the focusing lens 500. The single-channel photodetector 200 is used for detecting a sum of the beat radio frequency signals formed by adding all the beat radio frequency signals. In the present application, the optical path length of the first interference beam 31 is adjusted by moving the fourth mirror 740 and the fifth mirror 750, thereby ensuring that the radio frequency components of the first interference beam 31 and the second interference beam 32 are in phase when arriving at the single-channel photodetector 200, so as to maximize the amplitude of a combined coherent signal. This can be achieved when the optical path length difference between the first interference beam 31 and the second interference beam 32 is greater than an integer multiple of the center wavelength of a radio frequency signal. In the example shown in FIG. 2, the lens 500 and the detecting area of the single-channel photodetector 200 can be used as a beam selection device. The size of the detecting area of the single-channel photodetector 200 is arranged to be the same as or similar to the size of a pinhole. The beam selection device can receive beams and select beams from the received beams, such that each wavelength in those selected beams is encoded by a unique radio frequency. As an alternative, other beam selection device may be arranged. The beam selection device is configured to receive the output beams from the acousto-optic deflector 110, and select specific beams from the output beams such that each wavelength in those selected beams is encoded by a unique radio frequency. As an example, the beam selection device may be a spatial filter composed of lenses and a pinhole.

A digitizer 310 as a processing unit is connected to the output of the single-channel photodetector 200, and is used for performing a Fourier transformation on the sum of the beat radio frequency signals to obtain a spectrum.

According to the radio frequency tagging optical spectrometer of the present disclosure, light of each wavelength is labeled with different radio frequencies to achieve rapid spectral measurement, which can reach a speed of megahertz and can provide a signal-to-noise ratio. The radio frequency tagging optical spectrometer has great potentials in various applications such as aerosol particle size measurement, flow cytometry, and reaction detection.

According to the radio frequency tagging optical spectrometer of the present disclosure, frequency resolution (i.e., spectral resolution in terms of radio frequency) is heuristically defined as a radio frequency range $\Delta F$ required to scan a first-order diffracted beam on a zero-order transmitted beam on a detector. Assuming that the optics used in the system are ideal, according to the principle of the acousto-optic deflector, a displacement range of scan of the radio frequency range $\Delta F$ may be estimated from the left side of Formula 3, and a diameter of a zero-order transmitted beam of the detector may be estimated from the right side of Formula 3, where f is a focal length of the focusing lens, $V_a$ is a velocity of ultrasonic wave in the acousto-optic deflector, $\lambda$ is a wavelength, and $M^2$ and D are a beam quality factor and a diameter of an incident collimated beam respectively.

$$f \frac{\lambda \Delta F}{V_a} = \frac{4 \lambda M^2}{\pi} \frac{f}{D} \qquad \text{Formula 3}$$

All items except $\Delta F$ in Formula 3 are moved to the right, and the frequency resolution of the radio frequency tagging optical spectrometer is shown in Formula 4.

$$\Delta F = \frac{4 M^2 V_a}{\pi D} \qquad \text{Formula 4}$$

According to Formula 4, incident beam parameters in front of the focusing lens and the ultrasonic velocity $V_a$ determine the resolution of the radio frequency tagging spectrometer.

Focusing lens parameters (such as focal length) theoretically do not affect the resolution. This is different from a traditional monochromator-based spectrometer. The spectral resolution of the radio frequency tagging optical spectrometer may be estimated according to Formula 5, where $\Delta L$ is a width of an entrance or exit slit (whichever is greater), d is a groove spacing of a grating, f is a focal length of the focusing lens, and m is the number of diffraction orders.

$$\Delta \lambda = \frac{\Delta L}{fm} d \qquad \text{Formula 5}$$

Because the acousto-optic deflector acts as a movable grating when ultrasonic wave propagates inside the acousto-optic deflector, the groove spacing $d_{AOD}$ of the movable grating is equal to the wavelength $\lambda_a$ of the ultrasonic wave, as shown in Formula 6, where F is the frequency of a driving radio frequency signal for driving the acousto-optic deflector.

$$d_{AOD} = \lambda_a = \frac{V_a}{F} \qquad \text{Formula 6}$$

F is moved to the other side to obtain $V_a = F d_{AOD}$ Formula 7.

Formula 7 is substituted into Formula 4 to obtain Formula 8. It can be seen that the resolution of the radio frequency tagging optical spectrometer is proportional to the groove spacing $d_{AOD}$ of the movable grating, which is similar to the monochromator-based spectrometer.

$$\Delta F = \frac{4 M^2 F_a}{\pi D} d_{AOD} \qquad \text{Formula 8}$$

The diffraction in the acousto-optic deflector follows Formula 9, where θ is a diffraction angle of the first-order diffracted beam. The relationship between Δλ and ΔF may be derived as Formula 10 by moving F to the other side of Formula 9 and differentiating on both sides. Formula 8 is substituted into Formula 10 to obtain Formula 11, which is the resolution of the radio frequency tagging optical spectrometer in terms of wavelength. It can be seen that the resolution is proportional to the groove spacing.

$$\sin\theta = \frac{\lambda F}{2V_a} \quad \text{Formula 9}$$

$$\Delta\lambda = \frac{-\lambda}{F}\Delta F \quad \text{Formula 10}$$

$$\Delta\lambda = \frac{-4\lambda M^2}{\pi D}d_{AOD} \quad \text{Formula 11}$$

It can be seen from Formula 11 that the resolution of a wavelength can be improved by using a well-collimated beam and an acousto-optic deflector with a large aperture. Because $d_{AOD}$ is equal to $$\frac{V_a}{F} \text{ and } V_a$$

is assumed to be constant, a higher radio frequency will produce a better spectral resolution. For example, as shown in FIG. 2, the radio frequency tagging optical spectrometer may include a collimator 800, which may be, for example, a ray collimator, for collimating an incident beam.

Because the spectrum is obtained by Fourier transformation, data acquisition time determines a frequency interval that can be resolved. Given the desired frequency interval, the data acquisition time shall be set to be equal to or greater than a reciprocal of the frequency interval, so that all frequency components can be recovered. When the data acquisition time is set to the reciprocal of the frequency interval, the radio frequency tagging optical spectrometer reaches its maximum speed at the frequency interval. The greater the frequency interval is, the shorter the data acquisition time that can be used is, and the higher the speed is. Therefore, the speed limit of the radio frequency tagging optical spectrometer depends on the desired frequency interval required to recover a spectrum to be measured. Because wavelengths of interest can be selected by programming driving radio frequency signals, the radio frequency tagging optical spectrometer provides great flexibility to detect a part of spectrum containing most useful information, thus achieving a maximum speed up to millions of hertz.

The radio frequency tagging optical spectrometer is equipped with a dynamic dispersion device, that is, an acousto-optic deflector. The acousto-optic deflector usually has a diffraction efficiency of more than 80%, which is very close to the diffraction efficiency of a grating. When the driving radio frequency signal of the acousto-optic deflector includes a single radio frequency component, only one first-order diffracted beam with a single wavelength arrives at the single-channel photodetector, so the throughput of the radio frequency tagging optical spectrometer is equivalent to that of a conventional spectrometer. When the driving signals of the acousto-optic deflector include a plurality of driving radio frequency signals, a plurality of first-order diffracted beams with different wavelengths arrive at the single-channel photodetector at the same time. In this case, although the light of each wavelength is dispersed into many different first-order diffracted beams, each beam corresponds to a radio frequency, so only one of these beams is significantly attenuated when arriving at the single-channel photodetector, and optical power can be compensated by detecting multiple beams of each different wavelength at the same time.

According to a further embodiment of the present disclosure, a method for the measurements of optical spectra is provided.

Figure 3:
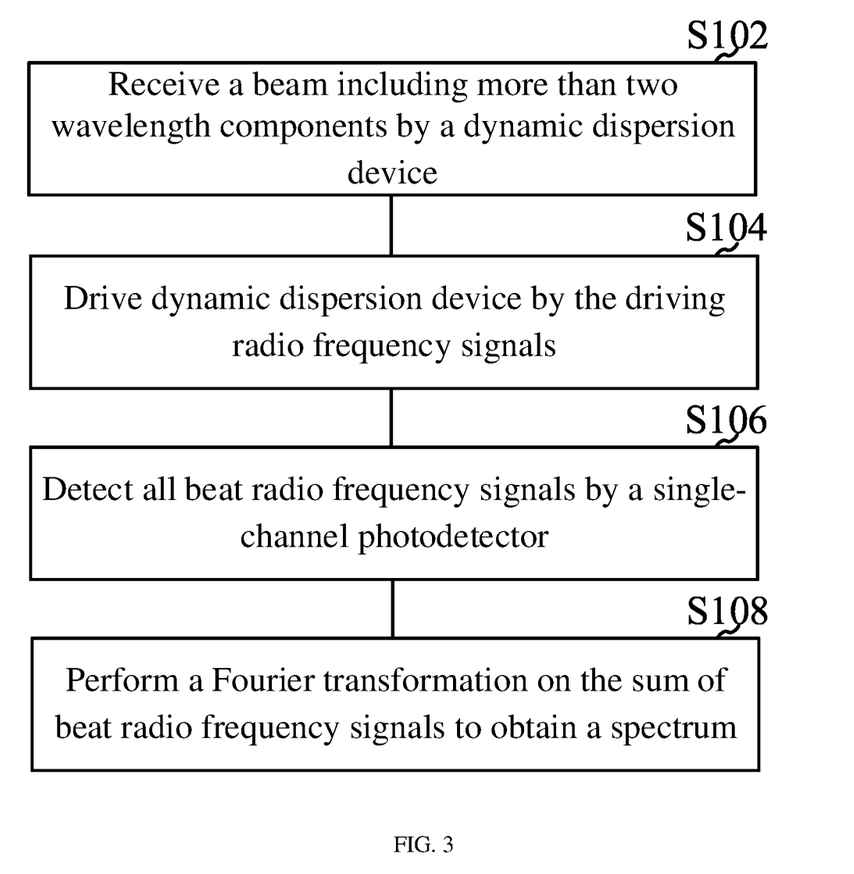
FIG. 3 is a flowchart of a method for the measurements of optical spectra according to an embodiment of the present disclosure.

FIG. 3 shows a method according to the present disclosure, which may include the following. The corresponding contents described above can be incorporated into the description of the method. For the sake of brevity, repetitive contents will not be described.

In step S102, a beam including more than two wavelength components is received by an acousto-optic deflector. The received beam of more than two wavelength components may be a collimated beam and may be a beam filtered by a spatial filter.

In step S104, the acousto-optic deflector is driven by driving radio frequency signals, so that the acousto-optic deflector encodes an intensity of each wavelength component into an amplitude of a different beat radio frequency signal based on different driving radio frequency signals. Each wavelength component corresponds to a unique driving radio frequency signal. Driving radio frequency signals of all wavelength components are simultaneously applied to the acousto-optic deflector. In the present disclosure, the different driving radio frequency signals may be selected according to the wavelength components of the beam, so that wavelength components of interest can be measured, which can improve the measurement speed. In addition, required driving radio frequency signals may be calculated according to the wavelength components of the beam, thereby providing the calculated driving radio frequency signals to the acousto-optic deflector.

In step S106, a sum of beat radio frequency signals may be detected by a single-channel photodetector. The sum of beat radio frequency signals is formed by adding all the beat radio frequency signals. In step S108, a Fourier transformation is performed on the sum of the beat radio frequency signals to obtain a spectrum. In step S108, the sum of the beat radio frequency signals may be processed by Fourier transform to obtain an associated radio frequency spectrum. The associated radio frequency spectrum is processed mathematically to eliminate the factor of dispersion efficiency to obtain the optical spectrum.

In the present disclosure, the specific beams may be selected from the output beams of the dynamic dispersion device such that each wavelength in those selected beams is encoded by a unique radio frequency. As discussed herein, the selection of the specific beams may be implemented by the spatial filter.

In the present disclosure, a beam of each wavelength component is split into a first-order diffracted beam and a zero-order transmitted beam by the acousto-optic deflector, the first-order diffracted beams of all wavelength components are formed into a combined first-order beam, the zero-order transmitted beams of all wavelength components are formed into a combined zero-order beam, and the combined first-order beam interferes with the combined zero-order beam, so that each wavelength component generates a beat radio frequency signal having a unique beat frequency. The combined zero-order beam is guided to the beam splitter by the first mirror, the combined first-order beam is guided to the beam splitter by the second mirror and the third mirror, and the combined first-order beam interferes with the combined zero-order beam to form a first interference beam and a second interference beam, where the first interference beam is guided to the focusing lens by the fourth mirror and the fifth mirror, and the second interference beam is guided to the focusing lens from the beam splitter. The first interference beam and the second interference beam are focused to the single-channel photodetector after passing through the focusing lens. The first interference beam and the second interference beam are controlled to be in phase when the radio frequency components of the first interference beam and the second interference beam arrive at the single-channel photodetector.

In the description of this specification, descriptions of the reference terms "one embodiment/manner", "some embodiments/manners", "example", "specific example", or "some examples", etc. mean that specific features, structures, materials, or characteristics described in connection with the embodiment/manner or example are included in at least one embodiment/manner or example of this application. In this specification, schematic expressions of the above terms need not be directed to the same embodiment/manner or example. Moreover, the specific features, structures, materials, or characteristics described may be combined in a suitable manner in any one or more embodiments/manners or examples. In addition, different embodiments/manners or examples described in this specification and features of different embodiments/manners or examples may be combined by those skilled in the art without contradicting one another.

Furthermore, the terms "first" and "second" are only for the sake of description, and cannot be understood as indicating or implying the relative importance or implicitly indicating the quantity of the indicated technical features. Thus, features defined as "first" and "second" may expressly or implicitly include at least one of the features. In the description of this application, "a plurality of" means at least two, e.g., two, three, etc., unless otherwise specified.

It shall be understood by those skilled in the art that the above-mentioned embodiments are intended to be clear illustrations of the present disclosure only and are not intended to limit the scope of the present disclosure. Other changes or modifications may be made on the basis of the above disclosure to those skilled in the art and remain within the scope of the present disclosure.

What is claimed is:

1. A radio frequency tagging optical spectrometer, comprising:
    a dynamic dispersion device, the dynamic dispersion device receiving a beam comprising more than two wavelength components and being driven by driving radio frequency signals, and the dynamic dispersion device encoding the intensity of each wavelength component into the amplitude of a different beat radio frequency signal based on different driving radio frequency signals, wherein the beat frequency of the different beat radio frequency signal is equal to the frequency of the corresponding driving radio frequency signal;
    a single-channel photodetector for detecting the sum of beat radio frequency signals formed by adding all the beat radio frequency signals; and
    a processing unit for performing Fourier transform on the sum of the beat radio frequency signals to obtain the optical spectrum, or obtain an associated radio frequency spectrum by which the optical spectrum is obtained.

2. The optical spectrometer according to claim 1, further comprising a beam selection device for selecting beams from the output beams of the dynamic dispersion device such that each wavelength in those selected beams is encoded by a unique radio frequency.

3. The optical spectrometer according to claim 2, wherein the beam selection device is a spatial filter that is used to select the output beams of the dynamic dispersion device such that each wavelength in those selected beams is encoded by a unique radio frequency.

4. The optical spectrometer according to claim 1, wherein the dynamic dispersion device is an acousto-optic deflector.

5. The optical spectrometer according to claim 4, further comprising a radio frequency amplifier for providing the driving radio frequency signals to the acousto-optic deflector, wherein the driving radio frequency signals of all wavelength components are simultaneously applied to the acousto-optic deflector.

6. The optical spectrometer according to claim 5, further comprising a programmable arbitrary function generator for providing a unique driving radio frequency signal corresponding to each wavelength component.

7. The optical spectrometer according to claim 5 wherein a beam of each wavelength component is split into a first-order diffracted beam and a zero-order transmitted beam by the acousto-optic deflector, the first-order diffracted beams of all wavelength components are merged into a combined first-order beam, the zero-order transmitted beams of all wavelength components are merged into a combined zero-order beam, and the combined first-order beam interferes with the combined zero-order beam, so that each wavelength component generates a beat radio frequency signal having a unique beat frequency.

8. The optical spectrometer according to claim 7, wherein the combined zero-order beam is guided to a beam splitter by a first mirror, the combined first-order beam is guided to the beam splitter by a second mirror and a third mirror, and the combined first-order beam interferes with the combined zero-order beam to form a first interference beam and a second interference beam, wherein the first interference beam is guided to a focusing lens by a fourth mirror and a fifth mirror, and the second interference beam is guided to the focusing lens from the beam splitter; and the first interference beam and the second interference beam are focused to the single-channel photodetector after passing through the focusing lens.

9. The optical spectrometer according to claim 8, wherein the radio frequency components of the first interference beam and the second interference beam are in phase when arriving at the single-channel photodetector.

10. The optical spectrometer according to claim 2, wherein a different driving radio frequency signal is selected according to each wavelength component.

11. The optical spectrometer according to claim 2, wherein the single-channel photodetector is a single-channel avalanche photodetector.

12. A method for the measurements of optical spectra, comprising:
    receiving a beam comprising more than two wavelength components by a dynamic dispersion device;
    driving the dynamic dispersion device with driving radio frequency signals, so that the driving radio frequency signals encodes the intensity of each wavelength component into the amplitude of a different beat radio frequency signal based on different driving radio frequency signals;

detecting, by a single-channel photodetector, the sum of beat radio frequency signals formed by adding all the beat radio frequency signals; and performing Fourier transform on the sum of the beat radio frequency signals to obtain the optical spectrum, or obtain an associated radio frequency spectrum by which the optical spectrum is obtained.

13. The method according to claim 12, wherein the associated radio frequency spectrum is processed mathematically to eliminate the factor of dispersion efficiency to obtain the optical spectrum.

14. The method according to claim 12, further comprising selecting beams from the output beams of the dynamic dispersion device such that each wavelength in those selected beams is encoded by a unique radio frequency.

15. The method according to claim 14, wherein using a spatial filter to select the output beams of the dynamic dispersion device such that each wavelength in those selected beams is encoded by a unique radio frequency.

16. The method according to claim 12, further comprising selecting different driving radio frequency signals according to the wavelength components of the beam, so that only wavelength components of interest are measured.

17. The method according to claim 16, further comprising calculating different driving radio frequency signals according to the wavelength components of the beam, so that the calculated driving radio frequency signals are provided to the dynamic dispersion device.

18. The method according to claim 16 wherein a beam of each wavelength component is split into a first-order diffracted beam and a zero-order transmitted beam by the dynamic dispersion device, the first-order diffracted beams of all wavelength components are merged into a combined first-order beam, the zero-order transmitted beams of all wavelength components are merged into a combined zero-order beam, and the combined first-order beam interferes with the combined zero-order beam, so that each wavelength component generates a beat radio frequency signal having a unique beat frequency.

19. The method according to claim 18, wherein the combined zero-order beam is guided to a beam splitter by a first mirror, the combined first-order beam is guided to the beam splitter by a second mirror and a third mirror, and the combined first-order beam interferes with the combined zero-order beam to form a first interference beam and a second interference beam, wherein the first interference beam is guided to a focusing lens by a fourth mirror and a fifth mirror, and the second interference beam is guided to the focusing lens from the beam splitter; and the first interference beam and the second interference beam are focused to the single-channel photodetector after passing through the focusing lens.

20. The method according to claim 19, wherein the first interference beam and the second interference beam are controlled to be in phase when the radio frequency components of the first interference beam and the second interference beam arrive at the single-channel photodetector.

* * * * *